(12) United States Patent
Morganti (10) Patent No.: US 11,370,013 B2
(45) Date of Patent: Jun. 28, 2022

(54) METHOD FOR SPIN FORMING LIPSKINS (71) Applicant: Standex International Corporation, Salem, NH (US)

(72) Inventor: Richard J. Morganti, Billerica, MA (US)

(73) Assignee: Standex International Corporation, Salem, NH (US)

( * ) Notice: Subject to any disclaimer, the term of this patent is extended or adjusted under 35 U.S.C. 154(b) by 427 days.

(21) Appl. No.: 16/019,790

(22) Filed: Jun. 27, 2018

(65) Prior Publication Data

US 2019/0184443 A1    Jun. 20, 2019

Related U.S. Application Data

(60) Provisional application No. 62/607,370, filed on Dec. 19, 2017.

(51) Int. Cl.
| | |
|---|---|
| *B21D 22/14* | (2006.01) |
| *B21D 53/92* | (2006.01) |
| *F02C 7/04* | (2006.01) |
| *B64D 29/00* | (2006.01) |
| *B64F 5/60* | (2017.01) |
| *B64D 33/02* | (2006.01) |

(Continued)

(52) U.S. Cl.
CPC ............. *B21D 22/14* (2013.01); *B21D 53/84* (2013.01); *B21D 53/92* (2013.01); *B64D 29/00* (2013.01); *B64D 33/02* (2013.01); *B64F 5/60* (2017.01); *C21D 9/00* (2013.01); *C22F 1/04* (2013.01); *F02C 7/04* (2013.01); *F05D 2220/323* (2013.01); *F05D 2230/232* (2013.01); *F05D 2230/26* (2013.01); *F05D 2230/30* (2013.01); *F05D 2230/41* (2013.01); *F05D 2300/6034* (2013.01)

(58) Field of Classification Search
CPC ........ B21D 22/14; B21D 53/84; B21D 53/92; B21D 53/16; B21D 22/16; B21D 22/18; C21D 9/00; C22F 1/04; F02C 7/04; B64D 29/00; B64D 33/02; B64D 2033/0273; B64F 5/60; B64F 5/00; F05D 2300/6034; F05D 2230/30; F05D 2230/41; F05D 2220/323; F05D 2230/232; F05D 2230/26; B64C 7/02; B23P 2700/01
See application file for complete search history.

(56) References Cited

U.S. PATENT DOCUMENTS

| | | | | |
|---|---|---|---|---|
| 6,955,283 | B2 * | 10/2005 | Kendall | ................. B21D 22/16 228/2.1 |
| 7,493,685 | B2 * | 2/2009 | Issagholian-Havai | ...................... B21C 37/0803 29/463 |

(Continued)

OTHER PUBLICATIONS

Aerospace Material Specification 2770 Rev. P, Apr. 2019.
Aerospace Material Specification 2658 Rev. D, Mar. 2016.
Aerospace Material Specification 2750 Rev. F, Jun. 2020.

*Primary Examiner* — Edward T Tolan
(74) *Attorney, Agent, or Firm* — Saxton & Stump, LLC (57) ABSTRACT

Method of manufacturing of components used in the field of aviation aircraft and, specifically, an aircraft engine nacelle lipskin. Instead of spinning flat plates, this method uses spinning a cylinder, thus eliminating waste material. It also eliminates the need for rivet lines which results in better laminar flow. Further, there is a reduction of other costs in addition to reducing drag.

10 Claims, 4 Drawing Sheets

(51) Int. Cl.
  *C21D 9/00*   (2006.01)
  *C22F 1/04*   (2006.01)
  *B21D 53/84*  (2006.01)

(56) References Cited

U.S. PATENT DOCUMENTS

| | | | | |
|---|---|---|---|---|
| 8,757,540 | B2* | 6/2014 | Olver | B64D 33/02 |
| | | | | 244/53 B |
| 9,764,849 | B2* | 9/2017 | Stark | B64D 29/06 |
| 10,946,974 | B2* | 3/2021 | Lebeda | F02C 7/04 |
| 2010/0260602 | A1* | 10/2010 | Binks | B64D 29/08 |
| | | | | 415/214.1 |
| 2015/0314850 | A1* | 11/2015 | Lumbab | B64D 33/02 |
| | | | | 415/215.1 |
| 2015/0367395 | A1* | 12/2015 | Ludlow | E21B 47/085 |
| | | | | 72/352 |
| 2016/0158820 | A1* | 6/2016 | Ludlow | B21D 53/92 |
| | | | | 72/314 |
| 2016/0237539 | A1* | 8/2016 | Gane | B22D 7/005 |

* cited by examiner

METHOD FOR SPIN FORMING LIPSKINS

This application claims benefit of U.S. Provisional Application Ser. No. 62/607,370 filed on Dec. 19, 2017, pursuant to 35 USC § 119(e).

FIELD OF THE INVENTION

The invention relates to the method of manufacturing of components used in the field of aviation aircraft and, specifically, an aircraft engine nacelle lipskin.

BACKGROUND OF THE INVENTION

The commercial airline industry continuously strives to remain competitive and profitable. Aircraft manufacturers are addressing this need through the use of more fuel-efficient aircraft designs that improve airflow and reduce drag; increase laminar flow; the use of more fuel-efficient engines; and the use of lighter weight materials in the construction of the aircraft.

Improvements to aircraft engine nacelles have included the introduction of lighter weight materials such as composites and aerodynamically improved cowl lipskin designs that reduce drag and improve performance. These lipskin design changes include lengthening of the inner and outer legs of the lipskin to the point where the barrel components and assembly to one another are eliminated. For large commercial aircraft, the existing manufacturing methods have fallen short on achieving the desired length of the integrated barrel and lipskin.

Traditional manufacturing methods for lipskins include deep drawing of flat sheet materials and metal spinning of flat sheets or plates in the forming of circular discs. Each of these manufacturing methods have fallen short in the ability to integrate the long barrel sections to the lipskin on large commercial aircraft.

Each of the methods of spinning flat plates or sheets as found in the prior art have a significant amount of waste of input material during the manufacturing process. Rectangular or square sheets are used for the input material for those methods. Prior to or after forming of the lipskin, the four corners of the input material and center disc are removed and, in most cases, this cut material is recycled as scrap.

SUMMARY OF THE INVENTION

Figure 4:
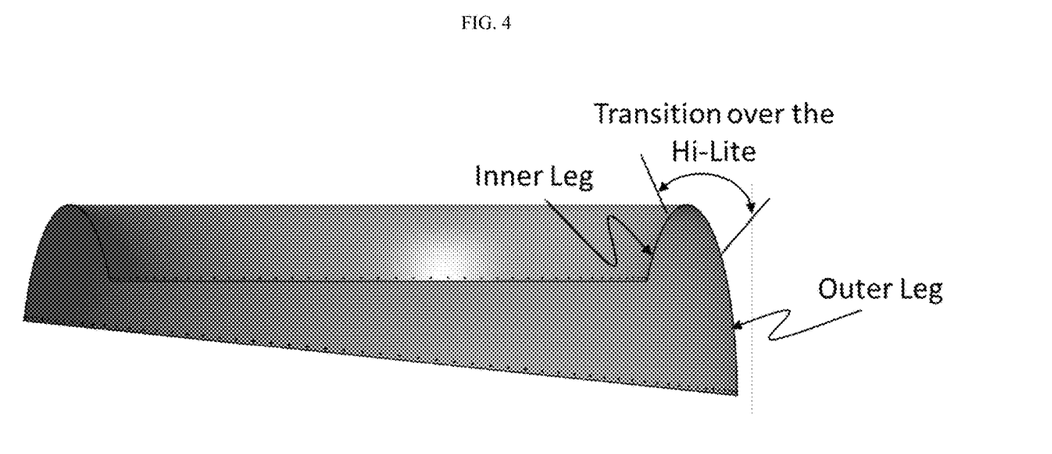
FIG. 4 is an illustration that shows the nomenclature used to determine the overall height of the starting cylinder blank

The method of manufacturing that can successfully integrate the barrel lengths to a desired length of lipskin is in the form of metal spinning a cylinder. The cylinder is sized to have the barrel length already established on the longest leg of the lipskin and includes additional length to form the lipskin nose (hi-lite of FIG. 4) and the barrel section of the other shorter leg.

The use of a cylinder consumes mostly all of the input material and eliminates the need for cutting and wasting corner and center drop material that must be trimmed using prior art methods to make a lipskin. The cylinder can be in the form of rolled and welded plates/sheets or seamless ring rolled forgings, step 401.

It is an aspect of the invention to eliminate the rivet line necessary from the lipskin to barrel as is found in the typical prior art which results in better laminar flow. Additionally, the amount of waste material is substantially reduced. Further, there is a cost savings in rivets and the labor required to install those rivets. Finally, the weight is reduced which improves fuel consumption, further reducing costs using the inventor's method of producing a lipskin.

The applicant achieves the advantages using his spin forming method by starting with a cylinder blank rather than a washer taught in prior art methods.

DETAILED DESCRIPTION OF THE INVENTION

Figure 1:
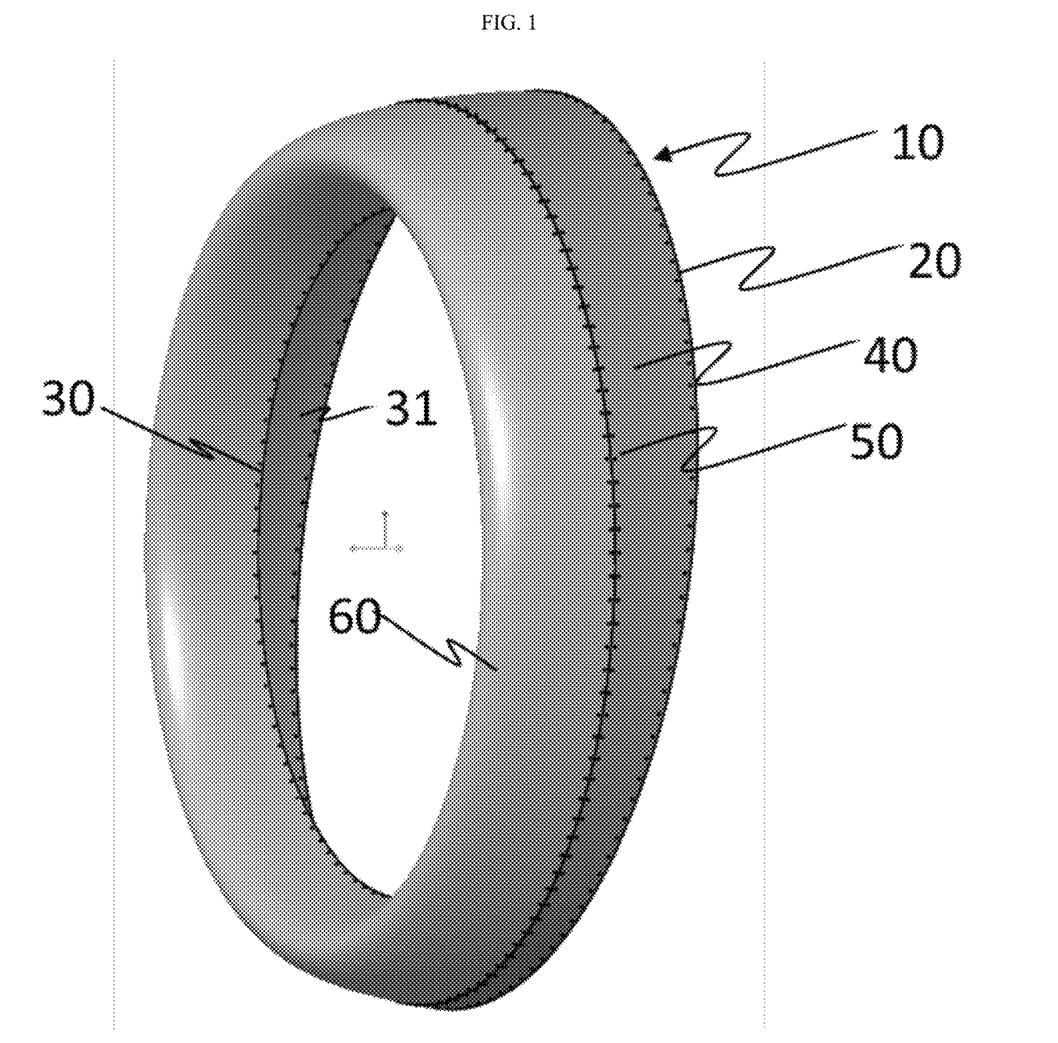
FIG. 1 is an illustration of a typical lipskin and outer barrel assembly (prior art).

As shown in FIG. 1, a typical prior art nacelle lipskin is depicted. In this figure, inlet assembly 10 is shown. Lipskin 60 is shown riveted to outer barrel 40 along rivet line 50. Lipskin 60 is also shown attached to the inner barrel 31 (not shown for clarity) along rivet line 30. Along rivet line 20, inlet assembly 10 is attached to remaining nacelle structure (not shown) via outer barrel 40. This structure is achieved by spin forming lipskin 60 as disclosed in Wilson et al. U.S. Pat. No. 9,664,113. It would be desirable if rivet line 50 attaching lipskin 60 to outer barrel 40 could be eliminated by spin forming part 10 together.

Figure 2:
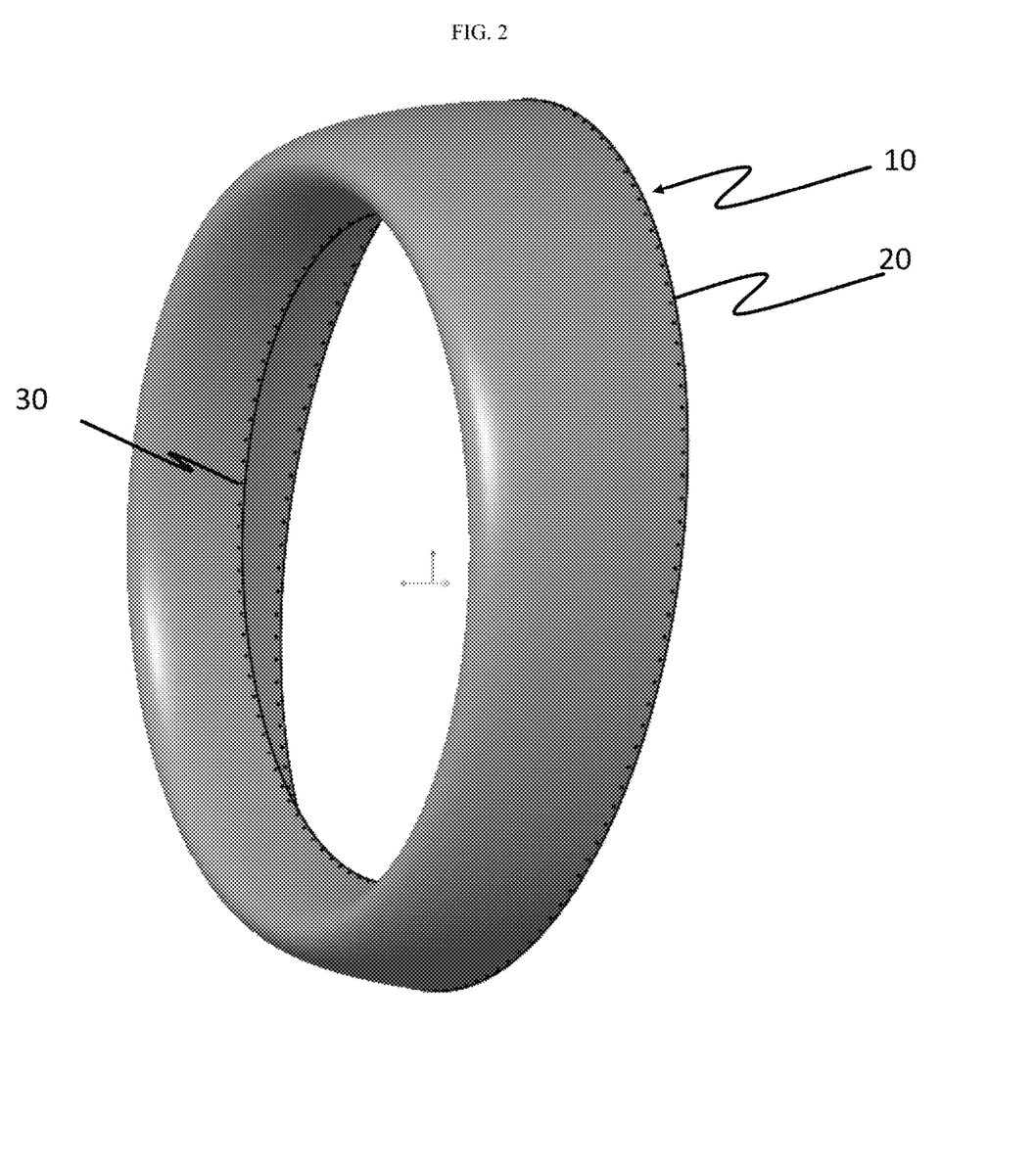
FIG. 2 is an illustration of a single piece lipskin with an integrated barrel.

As shown in FIG. 2, the inventive method of forming the lipskin assembly 10 using unique spinning techniques eliminates the need for rivet line 50 shown in FIG. 1. Inner rivet line 30 is still required as shown.

Figure 3:
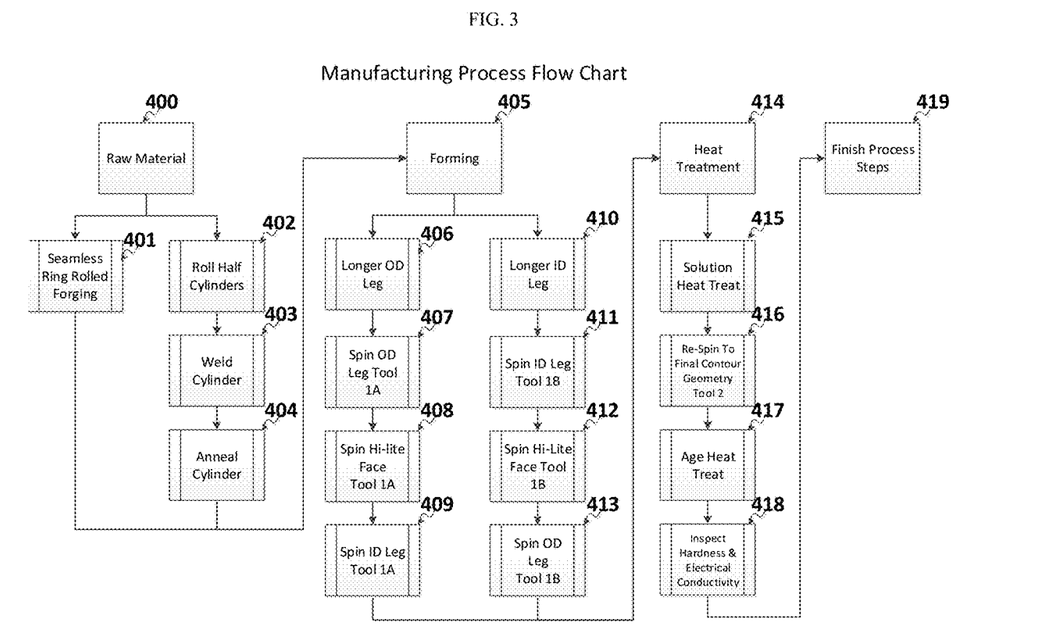
FIG. 3 is a flow chart of the preferred embodiment of the method in accordance with the invention

As shown in FIG. 3, the method of producing a lipskin/outer barrel integrated combination is described in detail and forms the essence of the invention. All dimensions and selections of materials used, process times, etc. are based on providing a lipskin/outer barrel combination suitable for a General Electric Turbofan Jet Engine Model 9X. This engine is the largest engine that G.E. has ever placed on a commercial aircraft. It is 132 inches in length and produces 102 thousand pounds of thrust. While this example applies specifically to the 9X, the method disclosed herein can be scaled by those skilled in the art to meet the requirements for any size or type of jet engine.

FIG. 3 describes the steps necessary to produce an integrated lipskin barrel combination. Step 400 involves selecting the blank from which the lipskin/outer barrel is spun. Aluminum grade 2219 is typical material used to produce lipskins and barrels. Diametrical sizing of the cylinder depends on which forming technique shown under step 405 is used. Steps 406 through 409 would be used when the final part has the outside leg longer than the inside leg. Steps 410 through 413 would be used when the inside leg is longer than the outside leg.

Using forming steps 406 through 409 would require the starting cylinder inside diameter to match the inside diameter of the outer barrel plus and minus allowances for shrink, and growth due to the thermal processes (annealing, spinning, solution heat treatment & quench, and precipitation hardening heat treatment), and minus any machining allowance for contour machining or chemical milling. The height of the cylinder blank is based on the linear length as measured along the outer leg, over the transition and hi-lite radii, and down to the end of the inner leg of the final part. See FIG. 4 for clarity of terms to determine the height of the cylinder.

Using forming steps 410 through 413 would require the cylinder outside diameter to match the outside diameter of the inner barrel plus and minus allowances for shrink and growth due to thermal processes (annealing, spinning, solution heat treatment & quench, and precipitation hardening heat treatment), plus any machining allowance for contour machining or chemical milling. The height of the cylinder is based on the linear length as measured along the inner leg, over the transition and hi-lite radii, and down to the end of the outer leg of the final part. See FIG. 4 for clarity of terms to determine the height of the cylinder.

By using either of these methods, little material is wasted and material is readily available in standard thicknesses, widths, and lengths produced by the aluminum suppliers. This blank material typically costs between $3.50 and $5.00 USD per pound. Use of a seamless ring rolled forging would be desirable if the final aircraft inlet assembly was to be entirely devoid of any axial rivet lines. For large aircraft inlet assemblies, there are typically two (2) or four (4) axial rivet lines used to accommodate the assembly process.

In the instance where a seamless ring rolled forging 401 is used for the starting blank, the size would be based on the same methodology used for the rolled and welded cylinder 402. Seamless ring rolled forgings are produced on ring rolling mills that transform thick cylindrical billets or ingots into large diameter cylinders by applying roller pressure to the thick cross section of the ingot/billet wall which reduces in thickness while growing the diameter of the ring.

In order to set the height of the resultant cylinder, the billet or ingot may go through a back extrusion or saddling process. In the case where the height limitations of the ring rolling mill cannot yield a cylinder of the desired length for the lipskin starting cylinder, the forging would be ordered with a thicker wall thickness to maintain material volume requirements to produce the lipskin.

A pre-form spinning operation would be added to the lipskin spin forming process to reduce the wall thickness and extend the length of the cylinder to bring the cylinder to the starting size requirements. Use of the seamless ring rolled forging is cited in this disclosure to allow nacelle designers full flexibility to design the lipskin for maximum efficiency and lowest mass. The cost and lead time impact for the additional processing of a ring rolled forging would have to be weighed against the use of a rolled and welded cylinder.

Welded cylinder preparation is completed as shown in steps 402 through 404. Flat plates purchased from material suppliers are cut to pre-determined lengths in preparation for rolling. Depending on the starting plate thickness and the weld process that will be used to join the plates together, each end of the plate may undergo a machining, water jet cutting, or grinding operation to prepare a weld joint geometry suitable for welding. Standard weld joint geometry would be selected from the American Welding Society Specification AWS D17.1.

In step 402, the flat plates are rolled into arc segments using standard plate rolling machines or press breaks. The number of arc segments will typically be two halves to make the cylinder. After rolling each segment, the radius and arc length are measured to ensure target dimensions have been achieved.

In step 403 the cylinder arc segments are fitted together at the weld joints and tack welded to hold the cylinder shape during the welding process. Welding processes available for use include friction stir welding, gas tungsten arc welding, and gas metal arc welding. Welding procedures and personnel will have undergone the qualification and approval requirements outlined in the American Welding Society Specification AWS D17.1.

After tack welding, the cylinder is measured to ensure the target diameter will be achieved after welding. The cylinder will then be welded using one of the processes identified above.

Upon completion of the welding, the weld crowns will be dressed to be flush with the parent metal, sanded smooth to a 63RMS finish to minimize stress risers in the material surface, visually inspected for surface defects, and target dimensions verified for compliance. In the rare instance where a weld is to remain in the final lipskin, non-destructive examination commensurate with the system service requirements will be performed using qualified personnel and procedures.

Once the part has been deemed acceptable for weld quality and dimensional features in step 403, the cylinder will be annealed as specified in step 404. Annealing parameters to be used will be based on the actual aluminum alloy used for the lipskin. The annealing parameters will be selected for the applicable alloy from Table 8 shown in The American Society of Metals Specification AMS 2770. All heat treatment requirements for annealing the cylinder and the furnace used must be compliant to the AMS 2770 specification and the specifications referenced therein.

Forming options are shown under step 405 and as previously stated based on the longest leg length of the final lipskin. Steps 406 through 409 represent a lipskin where the outer leg is the longest leg. The ensuing section outlines the details for steps 406 to 409.

In step 407, the forming mandrel (spin tool 1A) is loaded onto the spin lathe and attached to the main spindle. To spin form a lipskin, the spin lathe can be either a vertical or horizontal spin lathe provided it is equipped with a forming roller slide that is used for spin forming eccentric lipskins. Once the spin tool is secured to the main spindle, the cylinder is loaded onto the spin tool and mechanically clamped in place using a split ring and fasteners that hold the cylinder in place.

In step 407, the clamp ring is attached to the spin tool to allow clamping of the outside diameter (hereinafter OD) leg of the cylinder at the end of the OD leg to the spin tool. Clamp ring designs include wedge rings that draw the wedge ring into intimate contact with the cylinder and the OD leg of the spin tool thereby clamping the cylinder in place. Alternative clamp ring designs can include a tongue and grove design where the cylinder has a groove machined at the end of the cylinder and the mating clamp ring has the tongue feature, beveled ring options for clamping, and fastener options to fasten the cylinder directly to the spin tool.

Once the cylinder is clamped to the spin tool, a backing plate that is used to capture the outside diameter of the cylinder at the unclamped end is attached to the spin lathe tail stock. The tail stock then moves the backing plate into position where it captures the outside diameter of the cylinder. The backing plate is only used in the initial stages of the forming operation to prevent wrinkling of the cylinder, and is removed at a pre-determined step based on a specific lipskin design.

To ensure safe rigging, lifting, and handling of all tooling and materials used to produce the lipskin, all equipment, cranes, chains, slings, and fixtures shall have undergone all inspections, tests, and analysis prior to use. Certification and inspection records shall be maintained by the facility maintenance teams.

With the part clamped and backing plate engaged, the spindle is started to provide rotation for the forming steps. Spindle RPM is based on the machine capability for a specific part diameter and mass of the spin tool, mass of the lipskin blank, and mass of the backer plate as applicable.

The aluminum cylinder is heated using open air torches to a forming temperature range based on the specific alloy being formed. Generally, the forming temperature ranges from 450 to 650 degrees Fahrenheit. Temperature is monitored throughout the forming process using a Tempilstik® temperature indicating sticks and/or thermal imaging systems.

Once the cylinder is at the set point temperature range for spin forming, the forming roller is moved into position to spin form the cylinder over the spin tool. Forming starts at the base of the cylinder OD, and progresses towards the hi-lite. As stated above and at the predetermined location, the torches are turned off, and the backing plate removed from the tail stock. The tail stock is then moved to the center of the spin tool to maintain a constant force on the spindle. This will decrease the side loading force on the spindle that is generated when forming the lipskin.

The spindle is then restarted, torches are turned on, part heated to the set temperature range, and then the spin forming is continued until the entire cylinder has been formed and takes on the shape of the spin tool mandrel. The torches are then turned off and the part is slowly rotated until it has cooled to room temperature. Once the part is cooled, contour and thickness measurements are taken while the part is on the spin tool.

The part is then removed from the spin tool and prepared for solution heat treatment step 414. In some cases, depending on the size and complexity of a specific lipskin, this first forming step may require the use of two spin tools to achieve the desired geometry required for solution heat treatment. The decision to use an additional forming tool for the first operation is determined by those skilled in spin forming lipskins.

In advance of the solution heat treatment preparations for the post heat treatment step 414, spin forming operation must be complete. The final contour geometry spin tool (Tool 2) is loaded onto the spin lathe. The Tool 2 backing plate is attached to the tail stock and the Outside Diameter Clamp system is prepped for use. This forming operation will be performed at room temperature immediately after the lipskin is removed from the solution heat treatment quench tank. It may be possible to avoid this step and final spin the lipskin at a later time, if the lipskin producer has a certified freezer that the lipskin can be moved into immediately after quench. Maximum delay times between quench of the lipskin and movement to refrigerated storage, storage temperature options and maximum duration for refrigerated storage must be in accordance with Table 6 of The American Society of Metals Specification AMS 2770.

In Step 406, the lipskin formed in steps 407 through 409 is loaded onto the solution heat treatment fixture and secured to the fixture. Solution heat treatment is performed in an aluminum furnace with water or water-glycol quench capability. The furnace must meet all requirements set forth in The American Society of Metals Specification AMS 2770 and AMS 2750. All records for temperature surveys, equipment calibrations, system accuracy checks, and parts record keeping must be up to date and maintained, available for review.

Solution heat treatment and quench parameters to be used will be based on the actual aluminum alloy used for the lipskin. The parameters will be selected for the applicable alloy from the tables shown in The American Society of Metals Specification AMS 2770. Several tables with AMS 2770 apply to solution heat treatment and quenching of aluminum alloys. They have been listed for reference as follows.

Table 1 with Section 3.4.2 Quench Media Maximum Start Temperature

Table 2 Solution Heat Treat Temperature by Alloy

Table 3 Solution Heat Treat Soak Time by Thickness by Furnace Type

Table 4 Limits for Quenching in Polymer Solutions (Glycol)

Table 5 Maximum Quench Delay Times

In step 416, the solution heat treated lipskin is loaded onto the spin tool (Tool 2) and secured in place by moving the Tool 2 backing plate into position using the spin lathe tail stock. The spindle is rotated at the pre-determined speed in revolutions per minute. The lipskin is then spin formed at room temperature up to a maximum of 300 degrees Fahrenheit from the edge of the backing plate along the entire outside contour of the lipskin. The speed and feed rate of the forming roller are controlled by the CNC program developed for the specific lipskin.

Upon completing the outside contour spin forming operation, the spindle is stopped and the lipskin is clamped to spin tool 2 at the large end outside diameter. Once the clamping system is in place, the spin lathe tail stock moves the backing plate away from the formed lipskin. The spindle is restarted and rotated at a pre-determined speed and the forming roller is moved into the initial forming position.

The forming roller will start forming at room temperature at the transition from the outside contour spin, then move from along the outside contour towards the lipskin centerline, around the lipskin hi-lite, and along the inside contour to the end of the inside leg of the lipskin. The speed and feed rate of the forming roller are controlled by the CNC program developed for the specific lipskin.

Once the spin forming operation is complete, contour and thickness measurements are taken while the part is on the spin tool. Upon acceptance of the features, the lipskin is removed from the spin tool and prepped for age heat treatment.

In step 417 the lipskin formed in step 416 is loaded onto the age heat treatment fixture and secured to the fixture. Age heat treatment is performed in an aluminum aging furnace that meets all requirements set forth in The American Society of Metals Specification AMS 2770 and AMS 2750. All records for temperature surveys, equipment calibrations, system accuracy checks, and parts record keeping must be up to date and maintained, available for review. The age heat treatment parameters will be selected for the applicable alloy in Table 7 in The American Society of Metals Specification AMS 2770.

Upon completion of the age heat treatment in step 417, step 418 requires the lipskin to be inspected for hardness and electrical conductivity. Hardness and electrical conductivity validate that the desired temper of the aluminum was achieved during heat treatment. These tests must be conducted in accordance with The American Society of Metals Specification AMS 2658. Acceptance limits are defined in the specification for the applicable alloy and final temper of the lipskin.

Step 419 picks up with post lipskin forming and heat treatment operations that are required to produce the final lipskin that will be used in the inlet assembly. These steps include contour machining, chemical milling, polishing, final inspection, and the application of coatings and paint when required. These processes utilize existing well-known art and the ones actually used are selected by the lipskin producer.

Forming options are shown under step 405 and as previously stated based on the longest leg length of the final lipskin. Steps 410 through 413 represent a lipskin where the inner leg is the longest leg. The ensuing path where the longer leg of the lipskin is the ID begins at step 410.

The steps for this process are similar to produce a lipskin where the longer leg is the OD; that is, steps 406 through 409.

In step 411, the forming mandrel (spin tool 1B) is loaded onto the spin lathe and attached to the main spindle. To spin form a lipskin, the spin lathe can be either a vertical or horizontal spin lathe provided it is equipped with a forming roller slide that is used for spin forming eccentric lipskins. Once the spin tool is secured to the main spindle, the cylinder is loaded onto the spin tool and mechanically clamped in place using a split ring and fasteners that hold the cylinder in place.

In step 411, the clamp ring is attached to the spin tool to allow clamping of the inside diameter (ID) leg of the cylinder at the end of the ID leg to the spin tool. Clamp ring designs include wedge rings that draw the wedge ring into intimate contact with the cylinder and the ID of the spin tool thereby clamping the cylinder in place.

Alternative clamp ring designs can include a tongue and grove design where the cylinder has a groove machined at the end of the cylinder and the mating clamp ring has the tongue feature, beveled ring options for clamping, and fastener options to fasten the cylinder directly to the spin tool.

Once the cylinder is clamped to the spin tool, the tail stock is moved to engage the center of the spin tool. At this stage, there is no backing plate attached to the tail stock. The tail stock maintains a constant force through the spin tool to reduce side loads on the spindle during spin forming.

To ensure safe rigging, lifting, and handling of all tooling and materials used to produce the lipskin, all equipment, cranes, chains, slings, and fixtures shall have undergone all inspections, tests, and analysis prior to use. Certification and inspection record shall be maintained by the facility maintenance teams.

With the part clamped and the tail stock engaged, the spindle is started to provide rotation for the forming steps. Spindle RPM is based on the machine capability for a specific part diameter and mass of the spin tool, mass of the lipskin blank, and mass of the backing plate as applicable. The aluminum cylinder is heated using open air torches to a forming temperature range based on the specific alloy being formed. Generally, the forming temperature ranges from 450 to 650 degrees Fahrenheit. Temperature is monitored throughout the forming process using a Tempilstik® temperature indicating sticks and/or thermal imaging systems.

Once the cylinder is at the set point temperature range for spin forming, the forming roller is moved into position to spin form the cylinder over the spin tool. Forming starts at the base of the cylinder ID, and progresses towards the hi-lite. Forming continues around the hi-lite to a predetermined location along the OD contour. Once formed to the predetermined location, the torches are turned off and the tail stock retracted to home position. The backing plate that possess the female as formed geometry is attached to the tail stock. The tail stock is then moved to engage the part to provide additional clamping force to complete the spin forming of the remainder of the lipskin.

The spindle is restarted, torches turned on, part heated to the set temperature range, and then the spin forming is continued until the entire cylinder has been formed and takes on the shape of the spin tool mandrel. The torches are then turned off and the part is slowly rotated until it has cooled to room temperature. Once the part is cooled, contour and thickness measurements are taken while the part is on the spin tool.

Upon acceptance of these features, the part is then removed from the spin tool and prepared for solution heat treatment. In some cases that depend on the size and complexity of a specific lipskin as in the case of where the longer leg is the OD, this first forming step may require the use of two spin tools to achieve the desired geometry required for solution heat treatment. The decision to use an additional forming tool for the first operation is determined by those skilled in spin forming lipskins.

In advance of the solution heat treatment preparations for the post heat treatment, spin forming operation must be complete. The final contour geometry spin tool (Tool 2) is loaded onto the spin lathe. The Tool 2 backing plate is attached to the tail stock and the Outside Diameter Clamp system is prepped for use. This forming operation will be performed at room temperature immediately after the lipskin is removed from the quench tank. It may be possible to avoid this step and final spin the lipskin at a later time, if the lipskin producer has a certified freezer that the lipskin can be moved into immediately after quench as previously noted above. Maximum delay times between quench of the lipskin and movement to refrigerated storage, storage temperature options and maximum duration for refrigerated storage must be in accordance with Table 6 of The American Society of Metals Specification AMS 2770.

In Step 415, the lipskin formed in steps 410 through 413 is loaded onto the solution heat treatment fixture and secured to the fixture. Solution heat treatment is performed in an aluminum furnace with water or water-glycol quench capability. The furnace must meet all requirements set forth in The American Society of Metals Specification AMS 2770 and AMS 2750. All records for temperature surveys, equipment calibrations, system accuracy checks, and parts record keeping must be up to date and maintained available for review.

Solution heat treatment and quench parameters to be used will be based on the actual aluminum alloy used for the lipskin. The parameters will be selected for the applicable alloy from the tables shown in The American Society of Metals Specification AMS 2770. Several tables with AMS 2770 apply to solution heat treatment and quenching of aluminum alloys. They have been listed for reference as previously noted.

In step 416 the solution heat treated lipskin is loaded onto the spin tool (Tool 2) and secured in place by moving the Tool 2 backing plate into position using the spin lathe tail stock. The spindle is rotated at the predetermined speed in revolutions per minute. The lipskin is then spin formed at room temperature up to a maximum of 300 degrees Fahrenheit from the edge of the backing plate along the entire outside contour of the lipskin. The speed and feed rate of the forming roller are controlled by the CNC program developed for the specific lipskin.

Upon completing the outside contour spin forming operation, the spindle is stopped and the lipskin is clamped to spin tool 2 at the large end outside diameter. Once the clamping system is in place, the spin lathe tail stock moves the backing plate away from the formed lipskin. The spindle is restarted and rotated at the predetermined speed and the forming roller is moved into the initial forming position.

The forming roller will start forming at room temperature at the transition from the outside contour spin, move from along the outside contour towards the lipskin centerline, around the lipskin hi-lite, and along the inside contour to the end of the inside leg of the lipskin. The speed and feed rate of the forming roller are controlled by the CNC program developed for the specific lipskin.

Once the spin forming operation is complete, contour and thickness measurements are taken while the part is on the spin tool. Upon acceptance of the features, the lipskin is removed from the spin tool and prepped for age heat treatment.

In Step 417, the lipskin formed in Step 416 is loaded onto the age heat treatment fixture and secured to the fixture. Age heat treatment is performed in an aluminum aging furnace that meets all requirements set forth in The American Society of Metals Specification AMS 2770 and AMS 2750. All records for temperature surveys, equipment calibrations, system accuracy checks, and parts record keeping must be up to date and maintained available for review. The age heat treatment parameters will be selected for the applicable alloy in Table 7 in The American Society of Metals Specification AMS 2770.

Upon completion of the age heat treatment in Step 417, Step 418 requires the lipskin to be inspected for hardness and electrical conductivity. Hardness and electrical conductivity validate the desired temper of the aluminum was achieved during heat treatment. These tests must be conducted in accordance with The American Society of Metals Specification AMS 2658. Acceptance limits are defined in the specification for the applicable alloy and final temper of the lipskin.

Step 419 picks up with post lipskin forming and heat treatment operations that are required to produce the final lipskin that will be used in the inlet assembly. These steps include contour machining, chemical milling, polishing, final inspection, and the application of coatings and paint when required. These processes utilize existing art and the ones actually used selected by the lipskin producer.

Although the present invention has been described with reference to certain preferred embodiments thereof, other versions are readily apparent to those of ordinary skill in the preferred embodiments contained herein.

What is claimed is:

1. A method for spin forming an aircraft jet engine lipskin component having both a longer and shorter leg and inner and outer legs wherein a lengthening of the inner and outer legs of a lipskin/barrel combination to a point where barrel components and assembly to one another are eliminated, thus reducing drag and improving performance; said method comprising the steps of:

spinning a cylinder blank to form a lipskin/outer barrel integrated combination;

wherein said cylinder blank is sized to have a barrel length established on the longest leg of said lipskin/outer barrel integrated combination; and wherein said cylinder blank incorporates additional length to form a lipskin nose and a barrel section corresponding to the shorter leg, the cylinder blank has a height that is based on a linear length as measured along the outer leg, over a transition and hi-lite radii, and down to an end of the inner leg of the lipskin/outer barrel integrated combination;

heat treating said lipskin/outer barrel combination;

re-spinning said lipskin/outer barrel combination to provide a final geometry of said lipskin component;

age heat treating said lipskin component;

inspecting said lipskin component for hardness and electrical conductivity; and finishing said lipskin component to provide the finished lipskin component.

2. The method of claim 1 wherein said cylinder blank is provided by the steps comprising:

selecting a seamless ring rolled forging as said cylinder blank to provide said lipskin component wherein said lipskin component is devoid of any axial rivet lines.

3. The method of claim 1 wherein said cylinder blank is a welded cylinder provided by the steps comprising:

selecting a plurality of flat plates pre-cut to pre-determined lengths in preparation for rolling; wherein each plate undergoes additional steps of machining, water jet cutting, grind, to prepare weld-joint geometry for welding;

rolling said plates into arc halves wherein the two halves are used to make a cylinder; fitting together each arc segments together and tack weld each halve together in preparation for the welding step;

welding the two arc halves together to provide a welded cylinder blank.

4. The method of claim 3 wherein the welding step comprises one of the welding process steps of: friction stir welding; gas tungsten welding and gas metal welding.

5. The method of claim 3 for providing said cylinder blank further comprising the additional steps of:

sanding smooth the welds to minimize stress risers in the welds;

visually inspecting the welds for surface defects; and verifying the welded cylinder blank for target dimensions.

6. The method of claim 5 wherein if said weld is to remain in said lipskin component, the additional step for providing said cylinder blank requires non-destructive examination of the weld to be undertaken.

7. The method of claim 1 wherein said heat treating step is performed in an aluminum furnace with water or water-glycol quench capability.

8. The method of claim 1 wherein said age heat treating of said lipskin component is in an aluminum aging furnace meeting AMS 2770 and AMS 2750 requirements.

9. The method of claim 1 wherein said inspecting of said lipskin component for hardness and electrical conductivity is in accordance with AMS 2658 requirements.

10. The method of claim 1 wherein said finishing of said lipskin component to provide the finished lipskin component includes one or more of the steps of contour machining, chemical milling, polishing, final inspecting, and the application of coating and paint when required.

* * * * *